Patented Jan. 29, 1946

2,393,637

UNITED STATES PATENT OFFICE 2,393,637

PRINTING INKS

Wilbur L. Jones, New York, and Ernest De Lia, Brooklyn, N. Y., assignors to Interchemical Corporation, New York, N. Y., a corporation of Ohio No Drawing. Application May 31, 1941, Serial No. 396,176

4 Claims. (Cl. 260—14)

This invention relates to intaglio printing inks, particularly designed for use in the production of newspapers, and is directed to a new type of intaglio ink in which the vehicle is composed essentially of a rosin-modified phenol aldehyde resin having certain solvency characteristics.

In the printing of Sunday newspapers, the rotogravure sections and the comic supplement are usually prepared in advance. The two sections are ordinarily stored in contact with each other for at least twenty-four hours, in piles. As a result of the pressure, and the heat absorbed by the piles, the sections often stick together—a phenomenon known as "comic blocking." This difficulty does not occur frequently with nitrocellulose type intaglio inks, but is troublesome with inks made with resinous binders, which are dissolved in solvents having the order of volatility of benzene, and consisting essentially of petroleum naphthas fortified with active solvents such as acetone, methyl ethyl ketones, methyl and ethyl acetates, etc.

We have discovered that satisfactory intaglio printing inks for Sunday supplements may be made by using as the vehicles for the inks solutions of certain hard rosin-modified phenolic resins which are substantially insoluble or difficultly soluble in low solvency (dimethyl sulfate value below about 10) petroleum hydrocarbons dissolved in a mixture of a major proportion of such a low solvency solvent having a volatility of the order of benzene, and a minor proportion of a readily volatile oxygenated solvent of the group consisting of esters and ketones.

The outstanding characteristics needed in the resins employed are ready solubility in the mixed solvent employed to thin solutions, rapid solvent loss on drying, and substantial non-tackiness when in contact with ink oils, which are rather low solvency substantially non-volatile petroleum oils. We have found that substantial resistance to "comic blocking" can be obtained with any rosin-modified phenol aldehyde resin having a softening point, by the A. S. T. M. standard ball and ring method, of 138° C. or higher, and the proper solubilities.

The approximate resistance to blocking, as measured by solvency in ink oil can be estimated by melting the resin and mixing the melt with equal parts by weight of an ink oil—for example, an ink oil comprising a substantially non-volatile petroleum oil having a viscosity of 7 poises at 25° C., and a dimethyl sulfate value of 1.4, and a distillation range of 188° C. to 280° C. at 2 mm. pressure. The cooled mixture becomes a solid, non-sticky mass with all resins which are satisfactory for our purpose. When measured at 25° C. by means of a Humboldt penetrometer within 48 hours after making, using a 100 gram weight for 1 minute, resins which give readings above 3.5 millimeters are too soluble to give satisfactory resistance to "comic blocking."

Of course, the resin must be soluble in the solvent mixture employed for making the ink; and many of the harder resins of this class are insoluble, particularly such as are made from unmodified phenol.

Complete absence of comic blocking is noted for most resins having penetrometer readings of 1 mm. or less. The melts of such resins are opaque to hazy, indicating substantial insolubility even under the melt conditions; resins with higher penetrations give clear melts. Slight comic blocking is noticeable with such more soluble resins, and becomes commercially objectionable with resins whose solubility is good enough to give the softer plastics, above 3.5 mm. penetration.

Complete elimination of blocking can be obtained with the more soluble resins in our preferred range by the use of very small quantities of ethyl cellulose with the resin, using up to about 5 per cent. of ethyl cellulose. With resins whose plastics are softer than 3.5 mm. penetration, ethyl cellulose will not eliminate blocking, unless so much is used that the viscosity of the resultant ink becomes too great, and satisfactory glossy prints cannot be obtained.

Typical examples of our invention are the following:

*Example 1.—Red ink*

| | Parts by weight |
|---|---|
| Barium lithol toner | 10.0 |
| Methyl ethyl ketone | 12.0 |
| Petroleum solvent (dimethyl sulfate value 9.2 — evaporation rate approximating benzene—B. R. 90° C. to 115° C.) | 48.0 |
| Arochem 65 (rosin modified phenolic resin) | 30.0 |
| | 100.0 |

The resin is a rosin-modified phenol aldehyde resin, made from a para alkyl substituted phenol. It had a softening point (A. S. T. M. ball and ring method) of 159° C.; its 50% solution in the 1.4 dimethyl sulfate ink oil described above had a penetrometer hardness, when measured as described above, of 0.2 mm.

The ink had a satisfactory printing viscosity, and gave good gloss when printed from a standard intaglio cylinder. It showed no comic blocking at all.

Example 2

| | Parts by weight |
|---|---|
| Barium lithol toner | 6 |
| Resin | 40 |
| Methyl ethyl ketone | 10.8 |
| Naphtha (as in Example 1) | 43.2 |
| | 100.0 |

The resin can be made by reacting a mixture consisting of

| | Grams |
|---|---|
| Para tertiary butyl phenol | 331.5 |
| Bis phenol | 505.5 |
| Water | 500.0 |
| Flake NaOH | 64.0 |
| Water | 96.0 |
| 37% Formaldehyde | 988.0 | at 40° C. for 72 hours. 198.4 grams of 18° Bé. HCl is added, and the mixture washed by decantation. The resultant material is a phenol aldehyde resin which is oil-soluble. The modified resin is made from

| | Parts by weight |
|---|---|
| WW rosin | 866 |
| Above base resin (solid) | 173 |

The rosin is heated to 191° C. The base resin is added, and the mixture distilled at 269° C. until the desired A. S. T. M. softening point of 140–148° C. is obtained. This resin has a penetrometer reading, under the standard conditions outlined, of 2.1 millimeters; the jelly was clear. The ink printed nicely, and gave a print which was resistant to comic blocking, but showed some evidences under extreme conditions.

Example 3

| | Parts by weight |
|---|---|
| Barium lithol toner | 6 |
| Resin of Example 2 | 30 |
| Ethyl cellulose (7 centipoise viscosity, 49.5% ethoxy) | 2.5 |
| Methyl ethyl ketone | 13.5 |
| Naphtha (as in Example 1) | 41.5 |
| Alcohol | 6.5 |
| | 100.0 | are made with an ink which is almost identical in properties with the ink of Example 2, except that it shows no comic blocking even under extreme conditions.

The examples can of course, be multiplied indefinitely without departing from the scope of the invention which is defined in the claims.

The resins described above can be substituted by many others, provided the solubilities and hardness are correct. In general, the resins of the correct solubility range can be made by reacting alkyl substituted phenols with aldehydes, and the resultant with rosin, either as such or, modified (e. g. ester gum, hydrogenated rosin, etc.). The solubility is generally increased as the rosin content is increased, and the solubility decreases as the reaction is carried along further in the manufactuer of the resin. Satisfactory resins having penetrometer readings of 1.0 mm. or under, and yielding hazy to opaque melts, but which are readily soluble in the solvent mixtures employed, are Amberol 105° F. (0.8 mm. penetrometer) and Amberol M 93 (0.3 mm.) made by Resinous Products; Arochem 75 (0.3 mm.) made by Stroock & Wittenberg Corporation; Paranol 800 (0.7 mm.) made by Paramet Chemical; Beckacite 1116 (0.9 mm.) made by Reichold Chemicals; and France, Campbell and Darlings (FCD) #144 (1.0 mm.). Soluble resins yielding reasonably satisfactory prints, which can be completely protected by ethyl cellulose, and which give clear melts having penetrations in the range of about 1.0 to 3.5 mm., include FCD 157 (2.7 mm.), Beckacite 1124 (3.4 mm.), Amberol M 88 (1.2 mm.), Phenac 615 N (1.6 mm.) made by American Cyanamide and Chemical Corporation, and Lewisol 340 (1.5 mm.) made by John D. Lewis.

The pigment used can obviously be changed at will; the solvents can be any combination of a major portion of a low solvency highly volatile petroleum naphtha, and an oxygenated solvent of high volatility.

The ethyl cellulose used is of the standard solubility type (containing about 49% ethoxy) and is preferably of low viscosity; but less of a higher viscosity may be used with similar results, except that somewhat lower gloss is obtained.

We claim:

1. An intaglio printing ink resistant to "comic blocking" consisting of a pigment dispersed in a vehicle consisting of a solvent and a dissolved film-former selected from the class consisting of rosin-modified phenol aldehyde resins and rosin-modified phenol aldehyde resins admixed with up to 5% ethyl cellulose, said solvent comprising a major portion of a petroleum naphtha having a dimethyl sulfate value below about 10, and a minor proportion of an oxygenated solvent for the resin, of the group consisting of ketones and esters, the resin having an A. S. T. M. ball and ring softening point of 138° C. or higher, and yielding a 50-50 melt, with a petroleum distillate having a dimethyl sulfate value of about 1.4 and a viscosity of 7.0 poises and a 5-95% distillation range of 188° C. to 280° C. at 2 mm., having a penetration of not above about 3.5 millimeters measured on a Humboldt penetrometer at 25° C. using a 100 gram weight for 1 minute.

2. An intaglio printing ink proof against "comic blocking" comprising a pigment dispersed in a vehicle consisting of a rosin-modified phenol aldehyde resin dissolved in a solvent comprising a major portion of a petroleum naphtha having a dimethyl sulfate value below about 10, and a minor proportion of an oxygenated solvent for the resin, of the group consisting of ketones and esters, the resin having an A. S. T. M. ball and ring softening point of 138° C. or higher, and yielding at 50-50 melt, with a petroleum distillate having a dimethyl sulfate value of about 1.4 and a viscosity of 7.0 poises and a 5-95% distillation range of 188° C. to 280° C. at 2 mm., having a penetration of not above about 1.0 millimeters measured on a Humboldt penetrometer at 25° C. using a 100 gram weight for 1 minute.

3. An intaglio printing ink proof against "comic blocking" comprising a pigment dispersed in a vehicle of a rosin-modified phenol aldehyde resin and a significant quantity up to about 5%, of ethyl cellulose dissolved in a solvent comprising a major portion of a readily volatile petroleum naphtha having a dimethyl sulfate value below about 10, and a minor proportion of a readily volatile oxygenated solvent for the resin, of the group consisting of ketones and esters, the resin having an A. S. T. M. ball and ring softening point of 138° C. or higher, and yielding a 50-50 melt, with a petroleum distillate having a dimethyl sulfate value of about 1.4 and a viscosity of 7.0 poises and a 5-95% distillation range of 188° C. to 280° C. at 2 mm., having a penetration of not above about 3.5 millimeters measured on a Humboldt penetrometer at 25° C. using a 100 gram weight for 1 minute.

4. An intaglio printing ink resistant to "comic blocking" comprising a pigment dispersed in a vehicle consisting of a rosin-modified alkyl substituted phenol aldehyde resin dissolved in a solvent comprising a major portion of a petroleum naphtha having a dimethyl sulfate value below about 10, and a minor proportion of an oxygenated solvent for the resin, of the group consisting of ketones and esters, the resin having an A. S. T. M. ball and ring softening point of 138° C. or higher, and yielding a 50–50 melt, with a petroleum distillate having a dimethyl sulfate value of about 1.4 and a viscosity of 7.0 poises and a 5–95% distillation range of 188° C. to 280° C. at 2 mm., having a penetration of not above about 3.5 millimeters measured on a Humboldt penetrometer at 25° C. using a 100 gram weight for 1 minute.

WILBUR L. JONES.
ERNEST DE LIA.